(12) United States Patent
Dougherty et al.

(10) Patent No.: US 8,465,211 B2
(45) Date of Patent: Jun. 18, 2013

(54) COMPACT WHEEL END AND CORNER MODULE

(75) Inventors: John D. Dougherty, Canton, OH (US); Richard H. Miller, Canton, OH (US); Thomas J. Rybkoski, Canton, OH (US); Justin P. Bill, Lakewood, OH (US); Praveen M. Pauskar, Canton, OH (US)

(73) Assignee: The Timken Company, Canton, OH (US)

( * ) Notice: Subject to any disclaimer, the term of this patent is extended or adjusted under 35 U.S.C. 154(b) by 436 days.

(21) Appl. No.: 12/810,343

(22) PCT Filed: Jan. 9, 2009

(86) PCT No.: PCT/US2009/030558
§ 371 (c)(1), (2), (4) Date: Jun. 24, 2010

(87) PCT Pub. No.: WO2009/089420
PCT Pub. Date: Jul. 16, 2009

(65) Prior Publication Data
US 2010/0285890 A1 Nov. 11, 2010

(51) Int. Cl.
*F16C 35/04* (2006.01)
*F16C 33/76* (2006.01)
*F16C 33/58* (2006.01)

(52) U.S. Cl.
USPC ............ 384/589; 384/477; 384/571

(58) Field of Classification Search
USPC ............ 384/537, 544, 548, 564, 571, 589, 384/477
See application file for complete search history.

(56) References Cited

U.S. PATENT DOCUMENTS

| 1,911,336 | A | * | 5/1933 | Ackerman | 29/898.066 |
| 3,420,589 | A | * | 1/1969 | Williams et al. | 384/620 |
| 3,510,185 | A | | 5/1970 | McKee | |
| 3,578,831 | A | * | 5/1971 | Scheifele | 384/571 |
| 4,333,695 | A | * | 6/1982 | Evans | 384/562 |
| 4,397,507 | A | | 8/1983 | Kraus et al. | |
| 5,037,214 | A | * | 8/1991 | Dougherty | 384/589 |

(Continued)

FOREIGN PATENT DOCUMENTS

JP 2007271044 A * 10/2007
WO WO 2009089420 A1 * 7/2009

*Primary Examiner* — Marcus Charles
(74) *Attorney, Agent, or Firm* — Polster, Lieder, Woodruff & Lucchesi, L.C.

(57) ABSTRACT

A compact wheel end (A) serves to couple a road wheel (B) to a suspension system component (C) on an automotive vehicle and to transmit torque from a CV joint (D) to the road wheel. The wheel end includes a housing (2) that is attached to the suspension system component and a hub (4) provided with a drive flange (18) on which the road wheel is mounted and a spindle (20) that extends through the housing. The hub rotates relative to the housing on a double row tapered roller bearing (6), the raceways (40, 42, 44, 46) of which are surfaces on the housing and hub spindle. The wheel end also has a coupler (8) that is engaged with the hub spindle and the CV joint through mating splines (32, 72, 76, 94) and further provides a rib face (52) that backs the rollers (62) of the inboard row. The CV joint has a small diameter stub shaft (92) that extends through the hub to secure the CV joint to the hub, but does not transmit torque. The tapered roller bearing and coupler enable the wheel end to assume a radial size smaller than conventional wheel ends.

23 Claims, 8 Drawing Sheets

U.S. PATENT DOCUMENTS

| | | | |
|---|---|---|---|
| 5,454,647 A | 10/1995 | Otto | |
| 5,494,358 A | 2/1996 | Dougherty | |
| 5,740,895 A * | 4/1998 | Bigley | 192/69.41 |
| 5,984,422 A * | 11/1999 | Seifert | 301/105.1 |
| 6,299,360 B1 * | 10/2001 | Dougherty et al. | 384/544 |
| 6,443,622 B1 | 9/2002 | Webb et al. | |
| 6,532,666 B1 | 3/2003 | Denny, Jr. et al. | |
| 6,616,340 B2 | 9/2003 | Hacker | |
| 6,659,650 B2 * | 12/2003 | Joki et al. | 384/572 |
| 6,886,987 B2 * | 5/2005 | Shevket et al. | 384/589 |
| 7,670,059 B2 | 3/2010 | Gradu et al. | |
| 2003/0064817 A1 | 4/2003 | Hacker et al. | |
| 2007/0116397 A1 | 5/2007 | Pauskar et al. | |
| 2008/0252030 A1 * | 10/2008 | Gradu et al. | 280/93.512 |
| 2010/0218619 A1 * | 9/2010 | Dougherty | 73/862.335 |

* cited by examiner

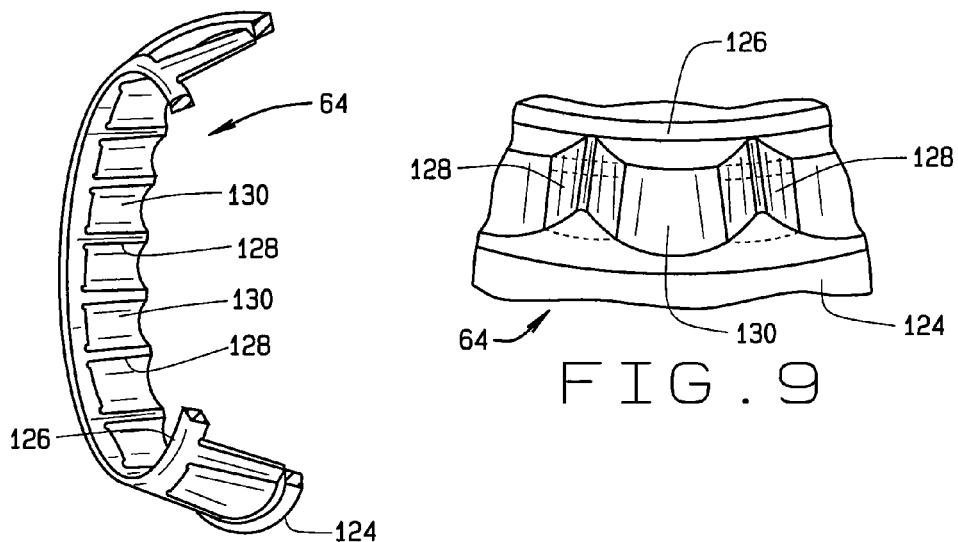
FIG. 8
FIG. 9
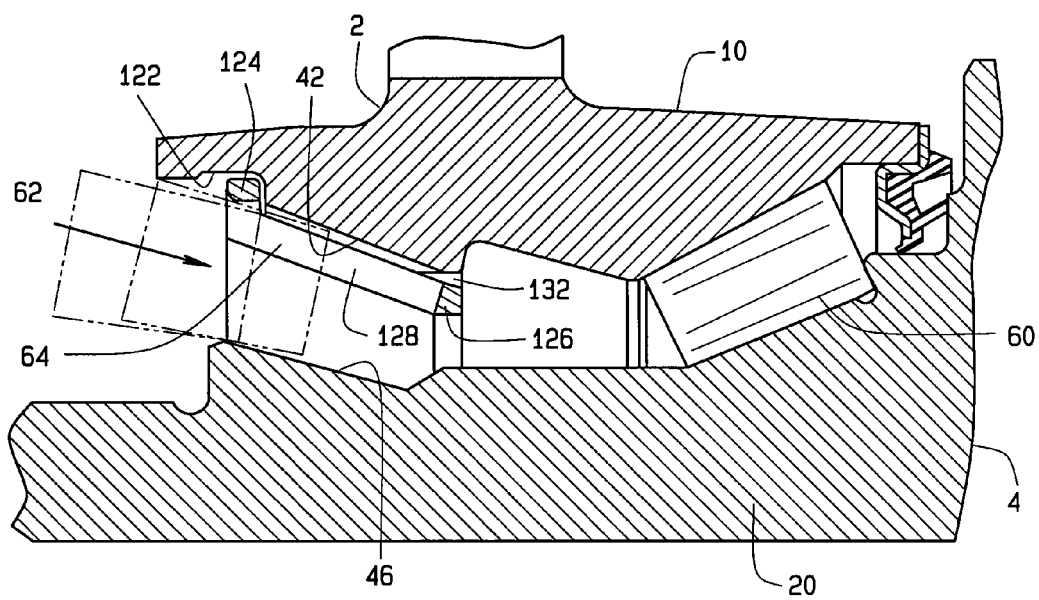
FIG. 10

COMPACT WHEEL END AND CORNER MODULE

CROSS REFERENCE TO RELATED APPLICATIONS

This application derives priority from and otherwise claims the benefit of U.S. Provisional Application 61/010,611, filed Jan. 10, 2008, and International Application PCT/US2009/030558, filed Jan. 9, 2009, and published under International Publication No. WO2009/089420, both of which are incorporated herein by reference.

TECHNICAL FIELD

This invention relates in general to wheel ends and corner modules for automotive vehicles and, more particularly, to a wheel end that is a highly compact and to a corner module including that wheel end.

BACKGROUND ART

Automobiles and light trucks of current manufacture contain many components that are acquired in packaged form from outside suppliers. The packaged components reduce the time required to assemble automotive vehicles and further improve the quality of the vehicles by eliminating critical adjustments from the assembly line. So-called "wheel ends" represent one type of packaged component that has facilitated the assembly of automotive vehicles. A wheel end couples a road wheel to the suspension system of the vehicle and transfers both radial and axial loads between the wheel and suspension system, all while allowing the wheel to rotate.

The typical wheel end has a housing that is bolted against a steering knuckle or other suspension upright, a hub provided with a drive flange to which the road wheel is attached and also a spindle that projects from the flange into the housing, and an antifriction bearing located between the housing and the hub spindle to enable the hub to rotate in the housing with minimal friction. If the road wheel propels the vehicle, the hub of the wheel end is coupled to a driven axle shaft through a constant velocity (CV) joint to provide a corner module. The CV joint has a stub shaft that projects into the hub spindle, with which it is engaged through mating splines, one in the hub and the other on the stub shaft.

The wheel ends of most automotive vehicles occupy considerable space within the wheels that are mounted on them. After all, the housing of the typical wheel end must possess considerable diameter—first, to accommodate the rows of rolling elements and the raceways along which they roll and secondly to accommodate a CV joint with a stub shaft large enough in diameter to transfer the torque required to propel the vehicle. This leaves less space for brake components.

The escalating cost of fuel for automotive vehicles has led the manufacturers of such vehicles to undertake measures to improve the efficiency of their vehicles—the so-called miles per gallon that the vehicles achieve. To this end, the manufacturers have sought to reduce the weights of their vehicles. Smaller wheel ends would weigh less and further produce less drag torque, and would thus satisfy an objective of the manufacturers.

BRIEF DESCRIPTION OF THE DRAWINGS

FIG. 8 is a perspective view, broken away, of an inboard cage forming part of the wheel end;

FIG. 9 is a partial fragmentary perspective view of the cage from another angle;

FIG. 10 is a fragmentary sectional view of the wheel end showing the inboard rollers as they are installed in it;

BEST MODE FOR CARRYING OUT INVENTION

Figure 1:
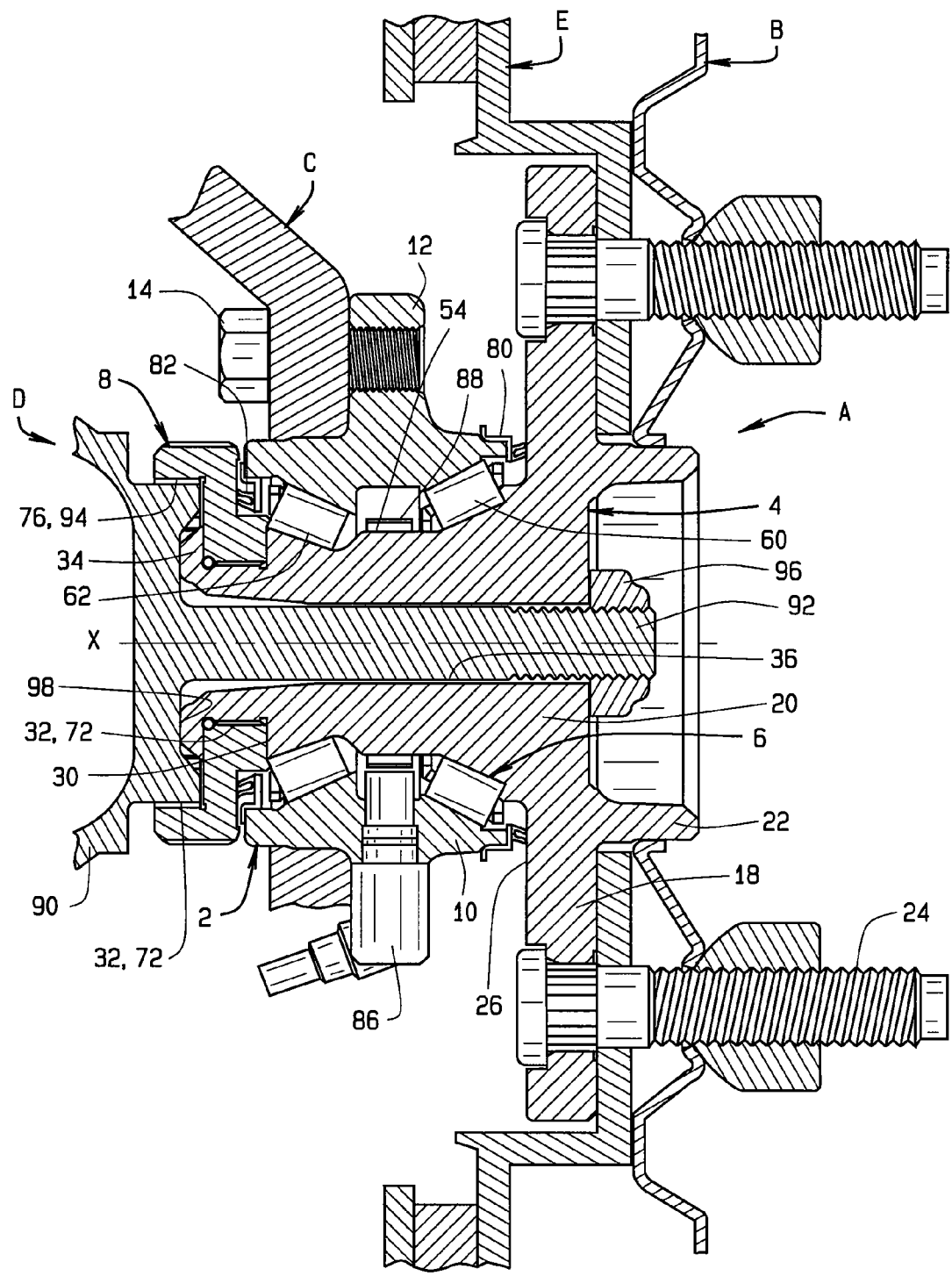
FIG. 1 is a longitudinal sectional view of a corner module, including a wheel end and a CV joint, constructed in accordance with and embodying the present invention.

A wheel end A (FIG. 1) serves to couple a road wheel B to a suspension system component C of an automotive vehicle and further transfers torque from a constant velocity (CV) joint D to the road wheel B. It also carries a brake rotor E or drum to retard rotation of the road wheel B. The wheel end A together with the CV joint D form a corner module for the vehicle. The wheel end A is organized about an axis X and enables the road wheel B to rotate about the axis X while confining the wheel B radially and axially.

The wheel end A basically includes (FIG. 1) a housing 2 that is attached to the suspension system component C, a hub 4 to which the road wheel B, the CV joint D, and the brake rotor E are connected, an antifriction bearing 6 located between the housing 2 and the hub 4, and a ring-like drive coupler 8 connected to the hub 4. The bearing 6 enables the hub 4 to rotate with respect to the housing 2 about the axis X with minimal friction. In relation to bearings of more traditional wheel ends, it is smaller. This reduces the size of the housing 2 and hub 4. The coupler 8 transfers torque from the CV joint D to the hub 4 which in turn transfers it to the road wheel B.

Figure 2:
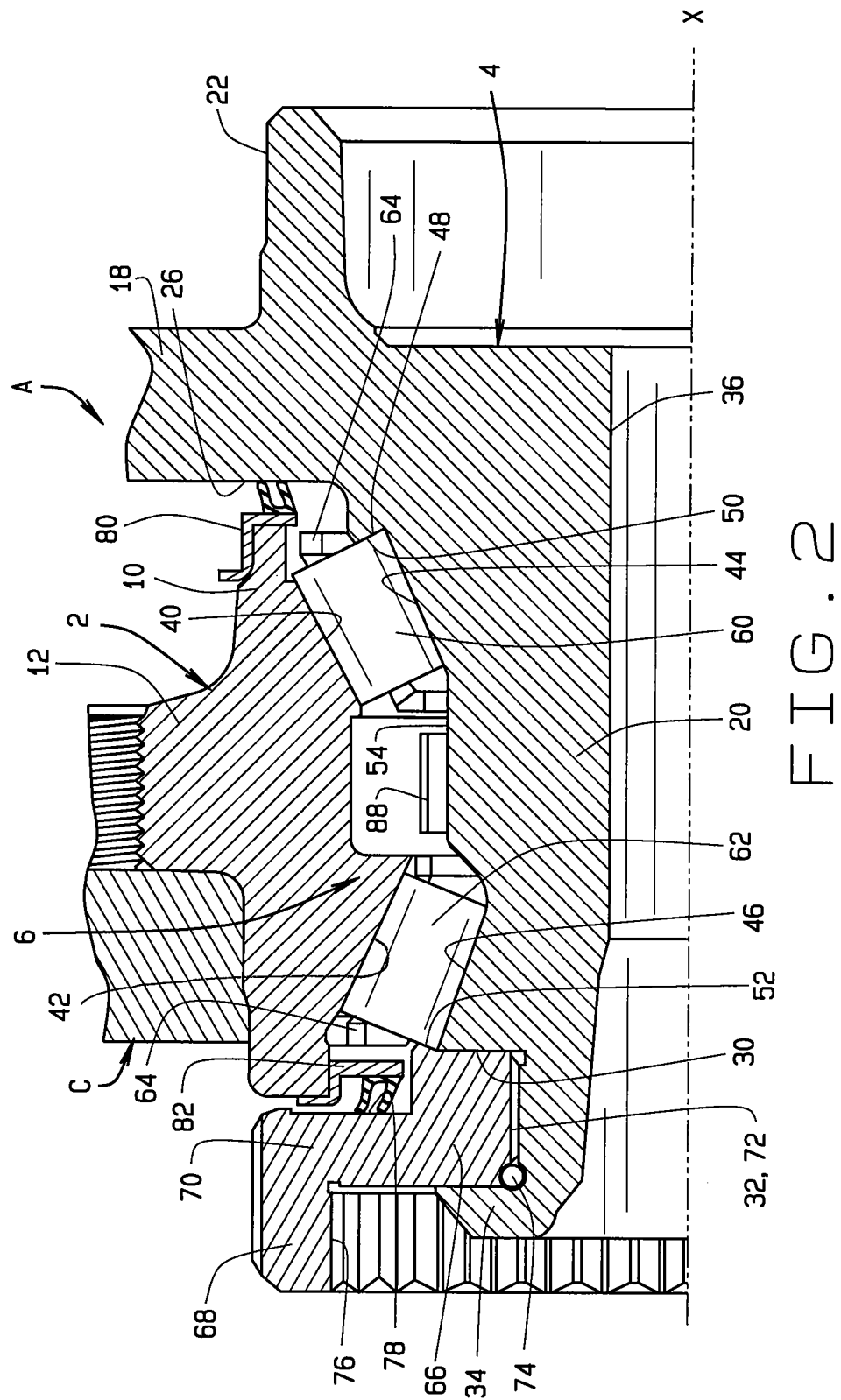
FIG. 2 is a fragmentary sectional view of the wheel end.

The housing 2 has (FIGS. 1 & 2) a generally cylindrical body 10 and a mounting flange 12 that projects outwardly from the body 10 near its inboard end. The flange 12 fits against the suspension system component C and receives cap screws 14 that secure the housing 2 to the component C.

The hub 4 has (FIGS. 1 & 2) a drive flange 18 that projects radially outwardly beyond the outboard end of the housing 2 and a spindle 20 that projects from the drive flange 18 into and through the housing 2. It also has a wheel pilot 22 that projects a short distance from the flange in the opposite direction to center the wheel B on the hub 4. The drive flange 18 carries lug bolts 24 for securing the road wheel B and brake rotor E to it. Directly opposite the outboard end of the cylindrical body 10 on the housing 2, the drive flange 18 has a machined sealing surface 26.

The spindle 20 of the hub 4 projects from the drive flange 18 into and through the cylindrical body 10 of the housing 2, and at its opposite end, that is at the inboard end of the housing 2, it has a shoulder 30 and an external spline 32 that leads away from the shoulder 30 to a formed end 34 that forms the very end of the spindle 20 and provides an abutment that is presented toward the shoulder 30. The formed end 34 is directed outwardly away from the axis X such that the spline 32 lies between the shoulder 30 and the formed end 34. The hub spindle 20 is manufactured without the formed end 34, but instead an axial extension beyond the spline 32. However, once the drive coupler 8 is installed over the spline 32, the axial extension is upset to form the formed end 34 with the coupler 8 captured between the shoulder 30 and the formed end 34. U.S. Pat. Nos. 6,443,622 and 6,532,666, which are incorporated herein by reference, describe processes for upsetting the axial extension of the hub spindle 20 to provide the formed end 34. Where the spline 32 leads away from the shoulder 30, the hub spindle 20 may be provided with an undercut relief to enable the spline 32 to be formed by a pot broach method, or a hobbing process, or a spline rolling process. The hub spindle 20 contains a through bore 36 which at one end opens out of the formed end 34 and at its other end opens into the wheel pilot 22 on the drive flange 18.

The bearing 6 includes (FIG. 2) two outer raceways 40 and 42, the former being outboard and the latter inboard. Both taper downwardly toward each other, yet are spaced apart at their small ends. Both preferably form surfaces on the cylindrical body 10 of the housing 2. The bearing 6 also includes two inner raceways 44 and 46 that taper downwardly toward each other and preferably form surfaces on the hub spindle 20. The outboard inner raceway 44 lies opposite the outboard outer raceway 46 and tapers in the same direction. It leads up to a thrust rib 48 that is preferably formed integral with the spindle 20 adjacent to the drive flange 18, there being a slight undercut between the raceway 44 and the thrust rib 48 as in the cones of traditional tapered roller bearings. The integral thrust rib 48 provides a rib face 50 at the large end of the outboard inner raceway 44. The inboard inner raceway 46 lies opposite the inboard outer raceway 42 and tapers in the same direction. It leads up to the coupler 8 which serves as a thrust rib, providing a rib face 52 at the large end of the inner raceway 46. Between the two inner raceways 44 and 46 the hub spindle 20 has a cylindrical mounting surface 54.

In addition to the raceways 40, 42, 44, and 46 and to the two rib faces 50 and 52, the bearing 6 has an outboard row of tapered rollers 60 located between the outboard raceways 40 and 44 and an inboard row of tapered rollers 62 located between the inboard raceways 42 and 46. While the tapered side faces of the outboard rollers 60 contact the raceways 42 and 46, the large end faces of the rollers 60 bear against the rib face 50 near the drive flange 18. The tapered side faces of the inboard rollers 62 contact the inboard raceways 42 and 46, while the large end faces of the rollers 62 bear against the rib face 52 on the coupler 8. Indeed, the rib faces 50 and 52 prevent the rollers 60 and 62 from being expelled from the annular space between the cylindrical body 10 of the housing 2 and the spindle 20 of the hub 4. The outboard rollers 60 are on apex, meaning that the conical envelopes in which their tapered side faces lie and likewise the conical envelopes in which the outboard raceways 40 and 44 lie have their apices at a common point along the axis X. The inboard rollers 62 are likewise on apex. Moreover, the bearing 6 is asymmetrical in that the outboard rollers 60 lie at a steeper angle and have a greater pitch diameter than the inboard rollers 62.

Finally, each row of rollers 60 and 62 has a cage 64 to maintain the proper spacing between the rollers 60 and 62 of the two rows.

The drive coupler 8 lies captured between the shoulder 30 and formed end 34 of the hub spindle 20, and thus encircles the spline 32. Aside from serving as a thrust rib for the inboard rollers 62 of the bearing 6, it couples the CV joint D to the hub 4, so that torque applied to the CV joint is transferred to the hub 4 and thence to the road wheel B. The coupler 8 possesses (FIG. 2) a somewhat Z-shaped cross-sectional configuration, it having (FIG. 2) an inner axially directed segment 66, an outer axially directed segment 68 of greater diameter, and a radial segment 70 connecting the axial segments 66 and 68. The inner axial segment 66 lies between the shoulder 30 and the formed end 34 at the end of the hub spindle 20 and has an internal spline 72 that engages the external spline 32 on the hub spindle 20. The formed end 34 turns outwardly against one end of the inner axial segment 66, and here a circlip 74 fits between the formed end 34 and the end of the internal spline 72 to prevent internal spline 72 from embedding in the formed end 34 during the roll-forming procedure by which it is created. The opposite end of the inner axial segment 66 bears against the shoulder 30. It extends radially outwardly beyond the shoulder 30, and here it is provided with the rib face 52 for the inboard row of rollers 62. The outer axial segment 68 lies beyond the inboard end of the cylindrical body 10 of the housing 2 and is offset axially with respect to the inboard axial segment 66. It contains an internal spline 76. The radial segment 70 has a machined sealing surface 78 presented toward the large ends of the inboard rollers 62.

The annular space between the cylindrical body 10 of the housing 2 and the spindle 20 of the hub 2, that is to say the space occupied by the rollers 60 and 62, is isolated by outboard and inboard seals 80 and 82. The outboard seal 80 has a case that fits over the outboard end of the cylindrical body 10 and elastomeric seal element that bears against the sealing surface 26 on the drive flange 18. The inboard seal 82 has a case that fits into the inboard end of the cylindrical body 10 and an elastomeric element that bears against the sealing surface 78 on the coupler 8. Actually, the case of either seal 80 or 82 could fit into a counterbore or over the end of the cylindrical body 10.

The housing 2 of the wheel end A may be fitted with a speed sensor 86 (FIG. 1) for monitoring the angular velocity of the hub 2, which is of course the angular velocity of the road wheel B. Actually, the speed sensor 86 monitors the angular velocity of a target wheel 88 that fits over the cylindrical mounting surface 54 between the inner raceways 44 and 46 on the hub spindle 20 and produces a signal that reflects the angular velocity.

The assembly of the wheel end A begins with loading the rollers 60 of the outboard row into the cage 64 for that row. Then the outboard rollers 60 and their cage 64 are inserted into the housing 2 along outboard outer raceway 40. Next the outboard seal 80 is press fitted to the outboard end of the cylindrical body 10 for the housing 2. This sequence allows for the seal 80 to extend radially inwardly past the large end of the cage 64 and the large ends of the outboard rollers 60.

With the outboard rollers 60 and cage 64 in the housing 2 and the outboard seal 80 in place, the spindle 20 of the hub 4 is inserted into the housing 2 from the outboard end of the cylindrical end of the cylindrical body 10, and it passes through the outboard seal 80 and the rollers 60 and cage 64 of the outboard row. It advances, perhaps with some rotation, until the outboard rollers 60 seat along the outboard raceways 40 and 44 with their large end faces against the outboard rib face 50. At this juncture the hub 4 does not have the formed end 34 at the inboard end of its spindle 20. Instead, the inboard end of the spindle 20 extends axially beyond the external spline 32 at that end at a diameter no greater than the grooves of the spline 32.

Once the outboard rollers 60 are in place between the housing 2 and the hub spindle 20, the inboard rollers 62 along with their cage 64 are inserted between the inboard raceways 42 and 46 until the tapered side faces of the rollers 62 seat against the raceways 42 and 46. With the two rows of rollers 60 and 62 in place between the cylindrical body 10 of the housing 2 and the spindle 20 of the hub 2, the drive coupler 8 is advanced over the external spline 32 at the inboard end of the hub spindle 20 until the end of its inner axial segment abuts the shoulder 30. This brings the rib face 52 on the inner axial segment 66 against the large end faces of the inboard rollers 62. The setting of the bearing 6 is thereupon determined, and this requires effecting rotation between the hub 4 and housing 2 to insure that the outboard rollers 60 seat against the outboard raceways 40 and 44 and against the outboard rib face 50 and that the inboard rollers 62 seat against the inboard raceways 42 and 46 and the inboard rib face 52. Preferably the setting is light preload. Typically, the drive coupler 8 is manufactured to initially provide end play. The correct setting is obtained by measuring the end play and machining a set distance from the inboard rib face 52 to the abutment shoulder 30 to remove the end play and create a slight preload.

Once the drive coupler 8 is machined to provide the proper setting for the bearing 6, the inboard seal 82 is inserted into the inboard end of the housing 2 and the drive coupler 8 is again installed over the spline 32 followed by the circlip 74, which may be split to insure that it fits snugly around the end of the spindle 20. Finally, the axial extension that initially exists beyond the spline 32 is upset in a roll-forming process to produce the formed end 34. The circlip 74 prevents the end of the spline 32 from embedding in the formed end 34 and creating stress concentrations. U.S. Pat. No. 6,299,360, which is also incorporated herein by reference, discloses the procedure for upsetting the end of a hub spindle over a circlip.

The CV joint D extends axially beyond the driven axle shaft to which it is coupled to provide universal movement between the axle shaft and the CV joint D, and the CV joint D is coupled to the hub 2 through the drive coupler 8. In this regard, the CV joint D includes (FIG. 1) a bell housing 90 and a stub shaft 92 that projects from the bell housing 90. Along its periphery the bell housing 90 has an external spline 94 that fits into the outer axial segment 68 of the drive coupler 8 and engages the internal spline 76 in the segment 68. The stub shaft 92 extends through the bore 36 in the hub spindle 20 and into the wheel pilot 22 where it is threaded and engaged with a nut 96. The bell housing 90 has an annular recess 98 that is presented axially toward the formed end 34 at the end of the hub spindle 20, which it receives. Indeed, when the nut 96 is turned down against opposite ends of the hub 4, it draws bell housing 90 against the formed end 34, the bell housing 90 abutting the formed end along the base of its recess 98.

In the operation of the wheel end A (FIG. 1), the CV joint D transfers torque to the hub 4 of the wheel end A through the engaged splines 94 and 76 on the bell housing 90 and the coupler 8, respectively with the torque from there transferring to the spindle 20 of the hub 4 through the engaged splines 72 and 32 on the coupler 8 and hub spindle 20, respectively. The stub shaft 92 of the CV joint D transfers no torque, but instead serves merely to hold the bell housing 90 and hub 4 together. As a consequence, it may have a relatively small diameter—certainly much smaller than a stub shaft designed to transfer torque to a hub through mating splines on the shaft and in the hub as is the conventional practice. This coupled with the tapered roller bearing 6, which will carry a load greater than an angular contact ball bearing of equivalent size, enables the hub spindle 20 and the housing 2 to assume dimensions much less than their counterparts in an angular contact ball bearing. In short, the wheel end A affords maximum radial downsizing, with the extent of the downsizing being dictated by the structural limits of the housing 2 and hub 4, and not necessarily by the bearing 6. The radial compactness of the wheel end A reduces the weight of the wheel end A and the CV joint D as well, and enables the brake rotor E to have larger areas that are swept by brake pads.

Figure 3:
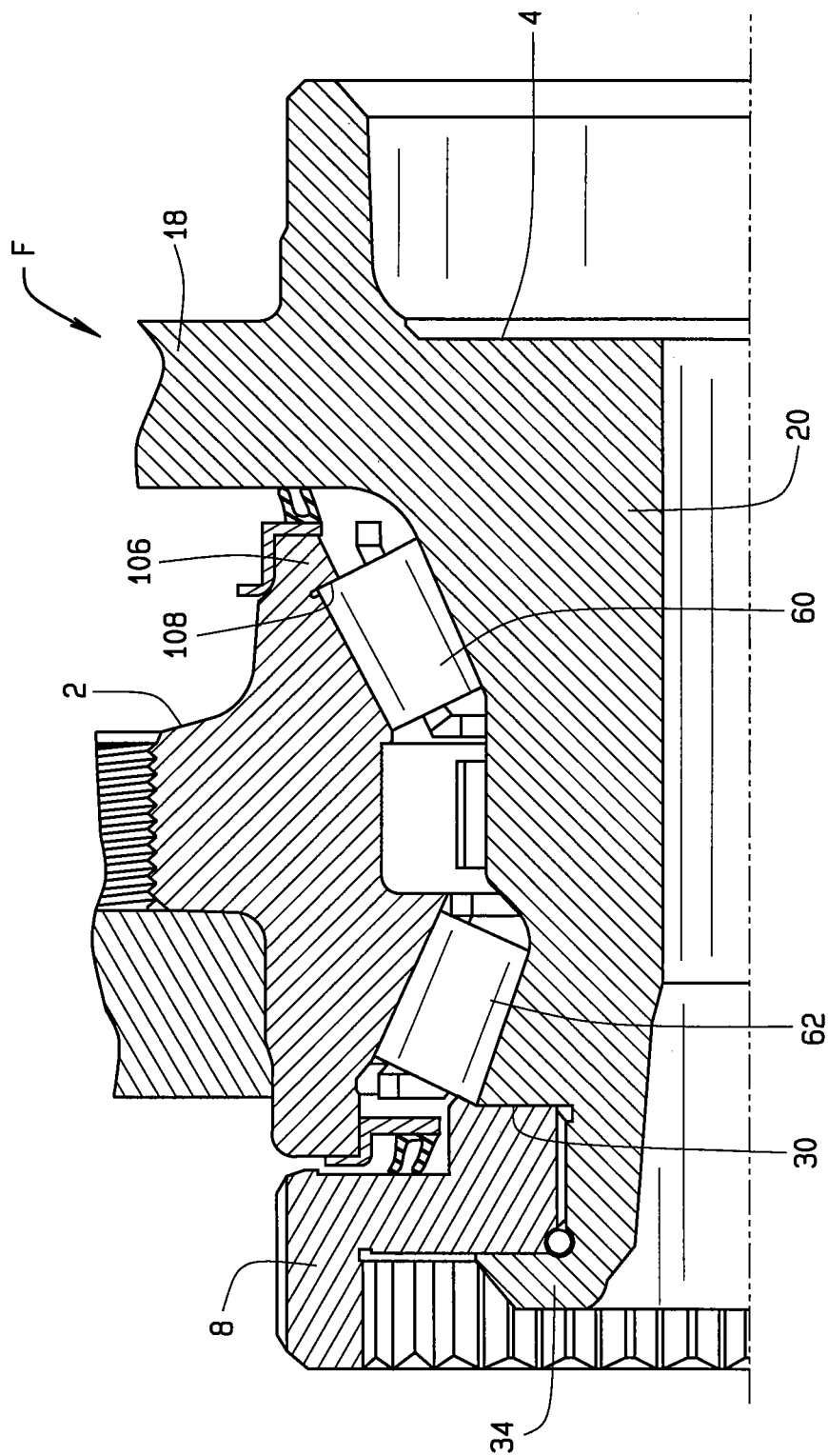
FIG. 3 is a fragmentary sectional view of an alternative wheel end.

An alternative wheel end F (FIG. 3) closely resembles the wheel end A. However, the outboard inner raceway 44 merges into the drive flange 18 along a concave surface devoid of a rib or rib face 50 or an undercut. As a consequence, stresses in this region do not concentrate at the large end of the outboard inner raceway 44 when the hub 4 is subjected to loads that induce high moments and the flexures that they produce, and this increases the strength and durability of the hub 4. Instead of confining the outboard rollers 62 axially along the hub spindle 20, they are confined axially by an inwardly directed thrust rib 106 at the outboard end of the cylindrical body 10 on the housing 2. The thrust rib 106 provides a rib face 108 against which the large ends of the outboard rollers 60 bear.

Figure 7:
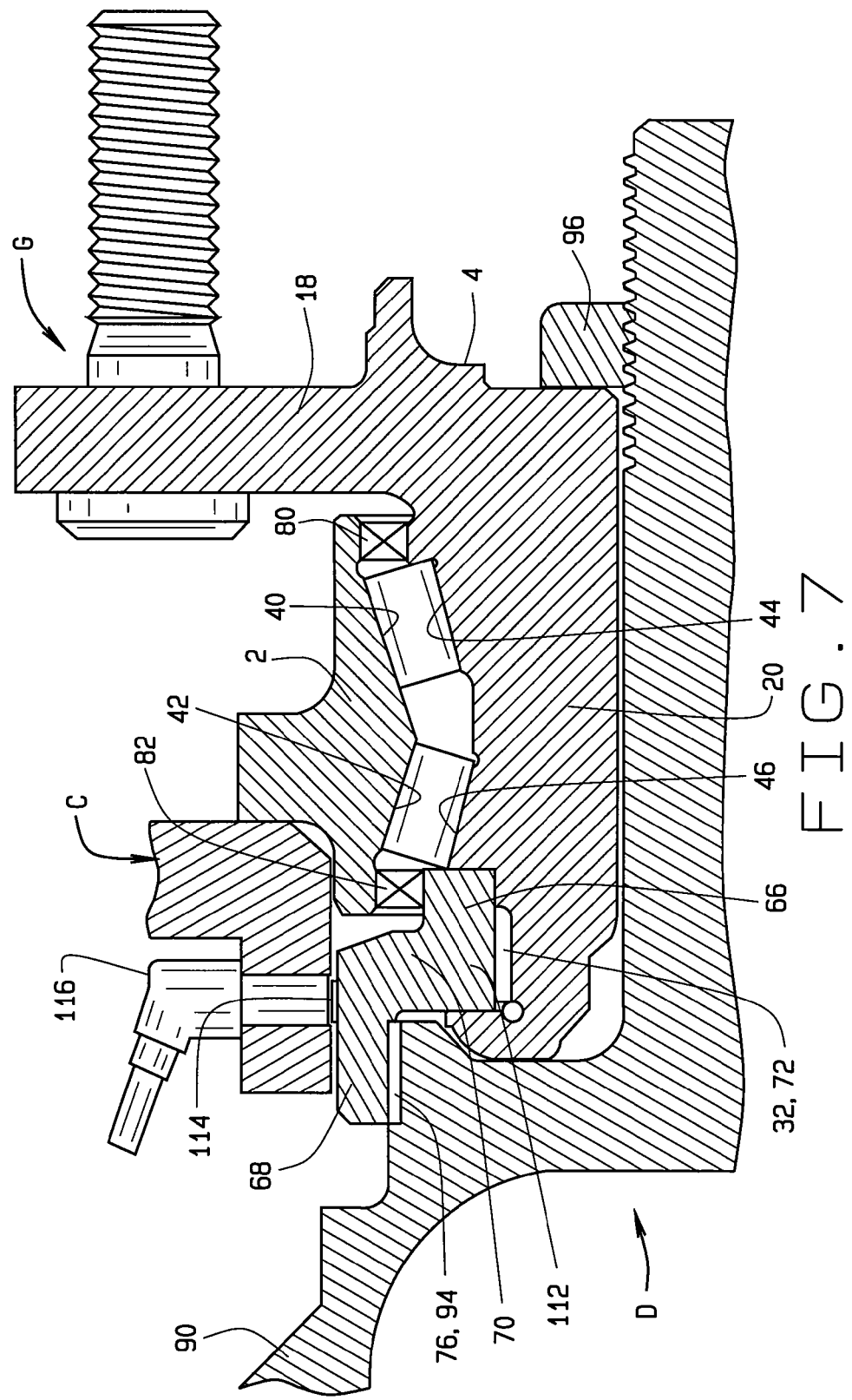
FIG. 7 is a longitudinal sectional view of an alternative corner module constructed in accordance with and embodying the present invention.

Another alternative wheel end G (FIG. 7) also differs from the wheel end A. For one, its outboard raceways 40 and 44 and its inboard raceways 42 and 46 may be set closer together, in that the housing 2 is devoid of the speed sensor 86 and the hub spindle 20 is devoid of the target wheel 88. The wheel end G has a modified drive coupler 112 that differs from the coupler 8 in that its outer axial segment 68 is extended axially and is fitted with a target wheel 114. The suspension system component C, which may be a steering knuckle, contains a speed sensor 116 that monitors the target wheel 114, producing a signal that reflects the angular velocity of the target wheel 114 and of course that of the hub 4 as well. The target wheel 114 may take the form of a stamping that is pressed over the outer surface of the drive coupler 112, or a magnetic encoder that is embedded in the coupler 112 at its outer surface, or teeth that disrupt the outer surface and may be formed by broaching or machining.

Figure 4:
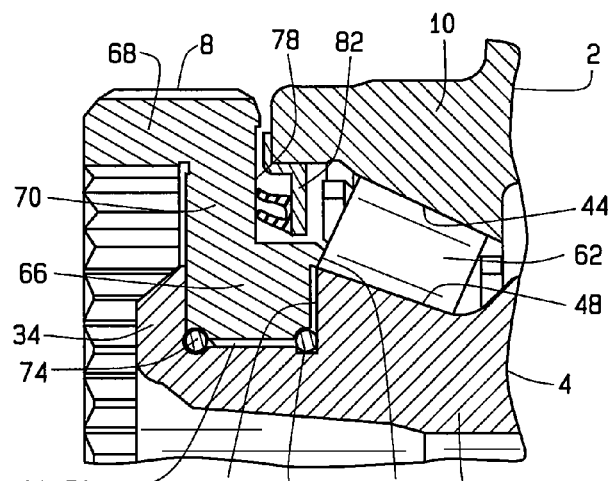
FIG. 4 is a fragmentary sectional view of an alternative installation for the coupler forming part of the wheel end.

In lieu of setting the bearing 6 by measuring end play and then machining a set distance from the rib face 52 on the drive coupler 8 to the abutment shoulder 30 on the hub spindle 20, the bearing 6 may be set by measuring the torque required to maintain rotation between the hub 4 and housing 2. The procedure relies on a variation of the procedure disclosed in U.S. published application US 2007/0116397 A1, which is incorporated herein by reference. In this procedure a slight gap exists between the end of the inner axial segment 66 of the drive coupler 8 and the shoulder 30 on the hub spindle 20, with this gap being established by another circlip 118 (FIG. 4) located around the opposite end of the external spline 32. The circlip 118, when compressed between the inner axial segment 66 of the drive coupler 8 and the shoulder 30 should be capable of undergoing a plastic deformation before either the coupler 8 or the shoulder 30 deforms plastically. Alternatively, the circlip 118 may be harder than the coupler 8 at the end of its inner axial segment 66, so that the plastic deformation occurs first in the coupler 8.

In the roll-forming process that upsets the axially directed end that initially exists on the spindle 20 and converts it into the radially directed formed end 34, the hub 4 rotates relative to the housing 2 and imparts a torque to the housing 2. The magnitude of the torque correlates to preload settings in the bearing 6—the greater the torque, the greater the preload. A predetermined torque, which is established empirically, corresponds to a desired setting in preload for the bearing 6. As the end of the hub spindle 20 forms up against one end of the inner axial segment 66 on the drive coupler 8, the other end of the axial segment 66—indeed, at the end of the internal spline 72 in the segment 66—compresses and deforms the circlip 118 against the shoulder 30. The ends of the spline 72 deform around the circlip 118, and the circlip 118 resists advancement of the drive coupler 8 over the external spline 32 on the hub spindle 20. Of course, as the drive coupler 8 advances, the rib face 52 on it moves the inboard rollers 62 down the two inboard raceways 42 and 46 and transforms the setting of the bearing 6 from end play to preload. The torque transferred between the hub 4 and housing 2 increases as the preload increases, and once the torque correlates with the desired preload setting for the bearing 6, the advancement ceases and the roll-forming procedure enters a dwell phase.

The circlip 118, as well as the circlip 74, may possess a circular cross section or it may be polygonal in cross section. It may be continuous or it may be split to enable it to expand radially and then contract to tightly grip the spindle 20. In essence, the circlip 118 serves as and indeed is a deformable spacer.

Figure 5:
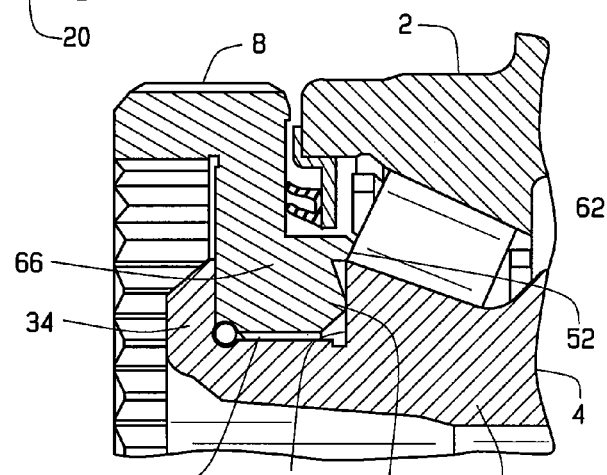
FIG. 5 is a fragmentary sectional view of another alternative installation for the coupler.
Figure 6:
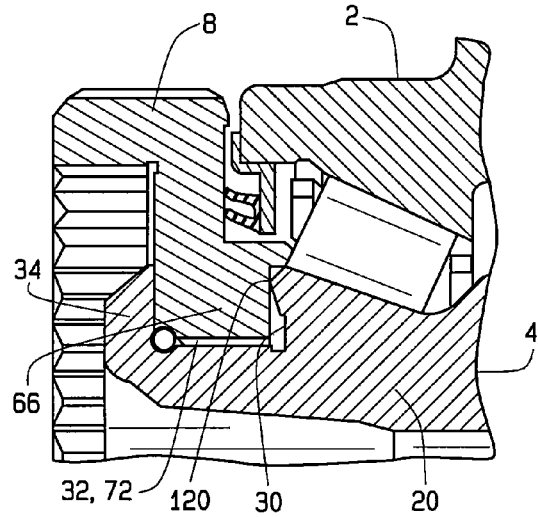
FIG. 6 is a fragmentary sectional view of still another alternative installation for the coupler.

The circlip 118 may be replaced by a protrusion 120 (FIG. 5) machined into that end of the inner axial segment 66 on the drive coupler 8 that is presented toward the shoulder 30. During the roll-forming procedure, the protrusion 120 comes against and is deformed against the shoulder 30. In the alternative, the hub spindle 20 may have the protrusion 120 machined into it at its shoulder 30 (FIG. 6). That protrusion 120 abuts and deforms against the end of the inner axial segment 66 of the drive coupler 8.

The circlip 118 or the protrusions 120, which accommodate setting the bearing 6 by measuring torque, allow the shoulder 30 to be somewhat smaller, which in turn enables the mating splines 32 and 72 on the hub spindle 20 and drive coupler 8, respectively, to assume a greater diameter. This, in turn, allows the drive coupler 8 to transfer greater torque to the hub 4 and road wheel B.

During the assembly of the wheel end A, the rollers 62 of the inboard row are inserted axially into the annular space between the inboard raceways 42 and 46 with the row in an expanded condition. As the rollers 62 advance axially into the space, the row contracts radially. In other words, the row of inboard rollers 62, when it enters the annular space, has a diameter greater than the diameter it assumes in its final operating position. The cage 64, which is preferably molded from a polymer, accommodates the change in diameter.

In this regard, the housing 2 at its inboard end has a counterbore 122 (FIG. 10) that leads away from the large end of the inboard outer raceway 42 at a greater diameter. The cage 64 for the inboard row of rollers 62 has (FIGS. 8-10) large end ring 124 that lies within the counterbore 122 beyond the conical envelope formed by the inboard row of rollers 62, a small end ring 126 located beyond the small ends of the rollers 62, and bridges 128 connecting the end rings 124 and 126 so as to provide pockets 130 for receiving the rollers 62, with each pocket 130 containing a single roller 62. The bridges 128, while separating the rollers 62, lie beyond the pitch circle for the row of rollers 62 and have beveled side faces that generally conform to the curvature of the rollers 62 where the bridges 128 actually separate the rollers 62. The small end ring 126 extends past the small ends of the rollers 62 and thus closes the small ends of the pockets 130. The large end ring 124 does not obstruct the large ends of the pockets 130, so the large ends of the pockets 130 are open.

Before the coupler 8 is installed over the spline 32 on the hub spindle 20, the inboard cage 64 is inserted into the annular space between the inboard raceways 42 and 46 with the large ends of its pockets 130 opening out of the space and the large end ring 124 occupying the counterbore 122. The inboard rollers 62 follow, each being inserted into the annular space at one of the open ends on the inboard cage 64. The inboard rollers 62 advance into the cage 64 to occupy its pockets 130. The inboard cage 64 along its small end ring 126 may have small outwardly directed tabs 132 that lie close to the inboard outer raceway 42 or other reference feature and guide the cage 64 if necessary.

Figure 11:
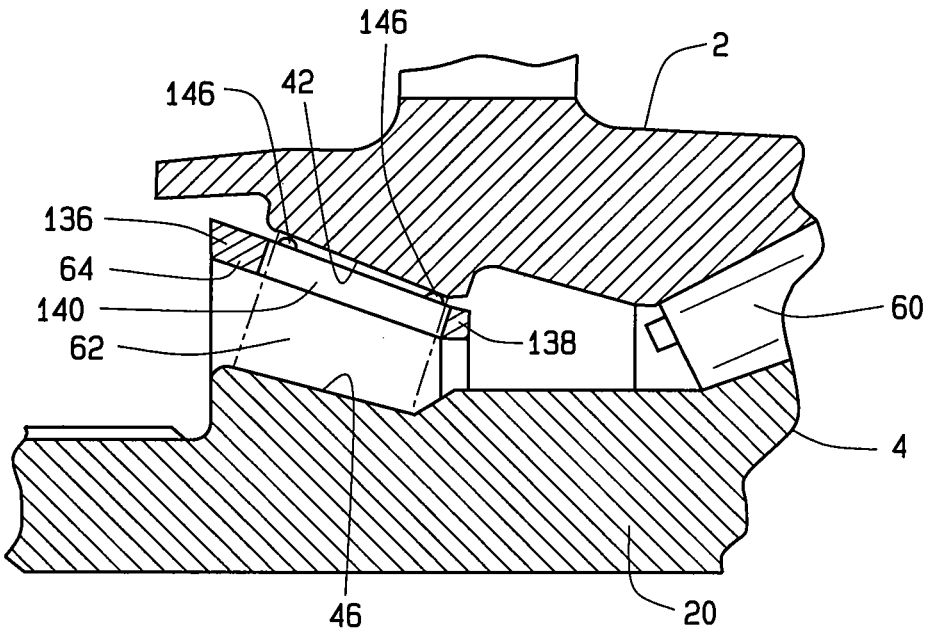
FIG. 11 is a fragmentary sectional view of the wheel end provided with an alternative cage for its inboard rollers.
Figure 12:
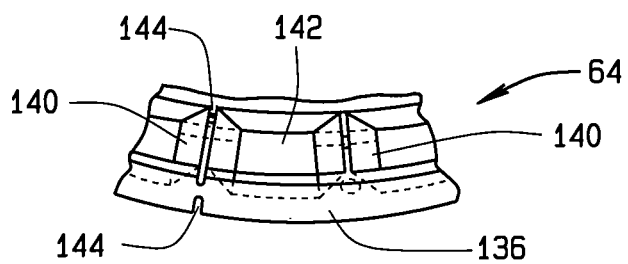
FIG. 12 is a fragmentary perspective view of the alternative cage.

The inboard cage 64 may assume an alternative configuration to accommodate the expansion required to accept the inboard rollers 62. The modified cage 64 has (FIGS. 11 & 12) the traditional large and small end rings 136 and 138 and axially directed bridges 140 connecting the end rings 136 and 138 to form pockets 142 that receive and contain the inboard rollers 62. The alternative cage 64 is preferably molded from a polymer. In contrast to traditional cages, one of the bridges 140 of the alternative inboard cage 64 has axially directed grooves 144 along both its inside and outside surfaces. They extend out into the end rings 136 and 138 and create regions of weakness in the cage 64 at that bridge 140.

The installation of the inboard row of rollers 62 between the housing 2 and hub spindle 20 begins with the insertion of the inboard rollers 62 into the pockets 140 of the alternative cage 64. It serves to confine the rollers 62 and arrange them in a circular row, the diameter of which generally corresponds to the diameter they will assume in the bearing 6. Thereupon, before the coupler 8 is installed over the spline 32 on the hub spindle 20, the cage 64 and the inboard rollers 62 contained in it are aligned with the end of the annular space between the inboard raceways 42 and 46. Upon entering the annular space the row of rollers 62 seeks to expand, and indeed as the rollers 62 advance axially over the large ends of the inboard inner raceway 46 the rollers 62 spread outwardly, stressing the cage 64. It fractures along the grooves 144 in one of its bridges 140, so that the cage 64 will accommodate the expansion. As the rollers 62 and cage 64 advance to their final positions in the space between the inboard raceways 42 and 46, the row of rollers 62 contracts and the cage 64 closes along its fractured bridge 140. To maintain the cage concentric with the raceway, its end rings 136 and 138 on each side of the severed bridge 140 have outwardly directed tabs 146 that lie close to the outer raceway—or to a surface on the housing 2—to pilot the alternative cage 64.

Figure 13:
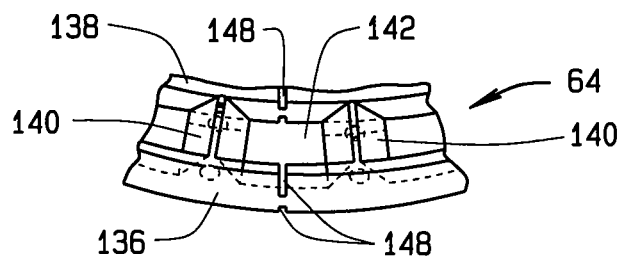
FIG. 13 is a fragmentary perspective view of another alternative cage similar to the cage of FIGS. 11 and 12.

Another alternative inboard cage 64 (FIG. 13) is essentially the same, it having large and small end rings 136 and 138 and bridges 140 that define pockets 142. However, all of the bridges 140 remain solid throughout, that is to say, none have an axial groove 144. Instead the alternative cage 64 along its end rings 136 and 138 at a single pocket 142 has notches 148, creating the region of weakness at that location. Here the cage 64 fractures when the inboard row of rollers 62 expands during installation over the inboard inner raceway 46.

Figure 14:
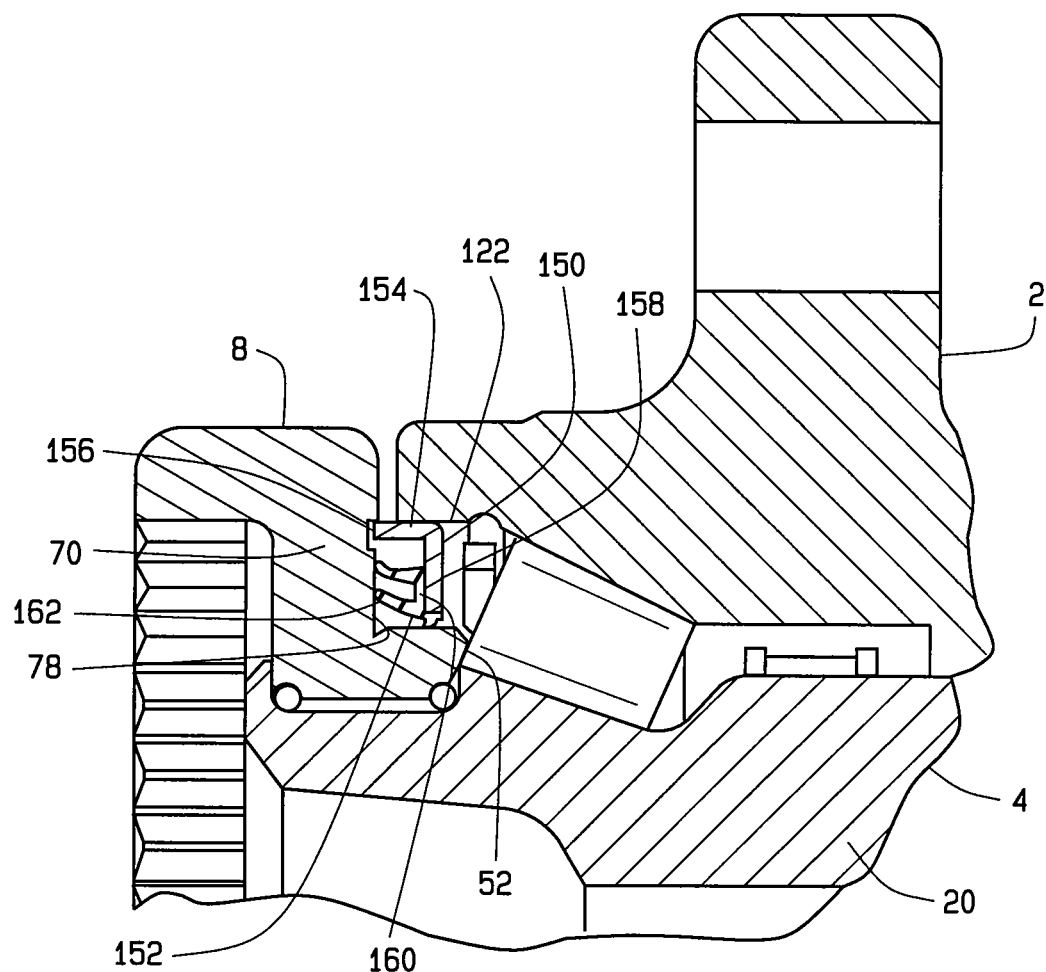
FIG. 14 is a fragmentary sectional view of the wheel end showing an inboard seal suitable for the wheel end.

Turning now to the inboard seal 82, it is installed in the counterbore 122 behind the inboard row of rollers 62 and the inboard cage 64, generally after they are inserted between the inboard raceways 42 and 46. It effects a dynamic fluid barrier with the coupler 8, and in order to function properly, it should be installed with some precision in the inboard end of the cylindrical body 10 of the housing 2. The inboard seal 82 fits into the counterbore 122, and includes (FIG. 14) a stamped metal case 150 and an elastomeric seal element 152.

The case 150 has (FIG. 14) an axial wall 154 that fits into the counterbore 122 with an interference fit, or it could just as well fit over the inboard end of the cylindrical body 10. Preferably it projects axially out of the counterbore 122 toward the radial segment 70 of the coupler 8 to effect a labyrinth-type barrier with the coupler 8. To render that barrier more effective, the radial segment 70 may have an annular groove 156 that opens toward and receives the very end of the axial wall 154. In addition to the axial wall 154, the seal case 150 has a radial wall 158 that projects inwardly from the axial wall 154 toward the inner axial segment 66 of the coupler 8. The seal element 152 includes a base 160 that is bonded to the radial wall 158 of the case 150 and lips 162—or at least one lip 162—that project generally axially from the base 160 toward the radial segment 70 of the coupler 8. Actually, the lips 162 flare outwardly slightly with respect to the axis X, and at their ends contact sealing surface 78 on the radial segment 70 of the coupler 8. Indeed, they are deflected by the sealing surface 78, so that the natural resiliency of the elastomer maintains them in contact with the sealing surface 78. The location of the seal case 150 relative to the large end faces of the inboard rollers 62, which is the position the inboard rib face 52 will assume when the coupler 8 is installed, is measured as the seal case 150 is forced into the counterbore 122, with the advancement terminating when the seal case 150 reaches a prescribed position with respect to the large end faces of the rollers 62. This places the lips 162 at a location to acquire the proper deflection once the coupler 8 is installed.

Figure 15:
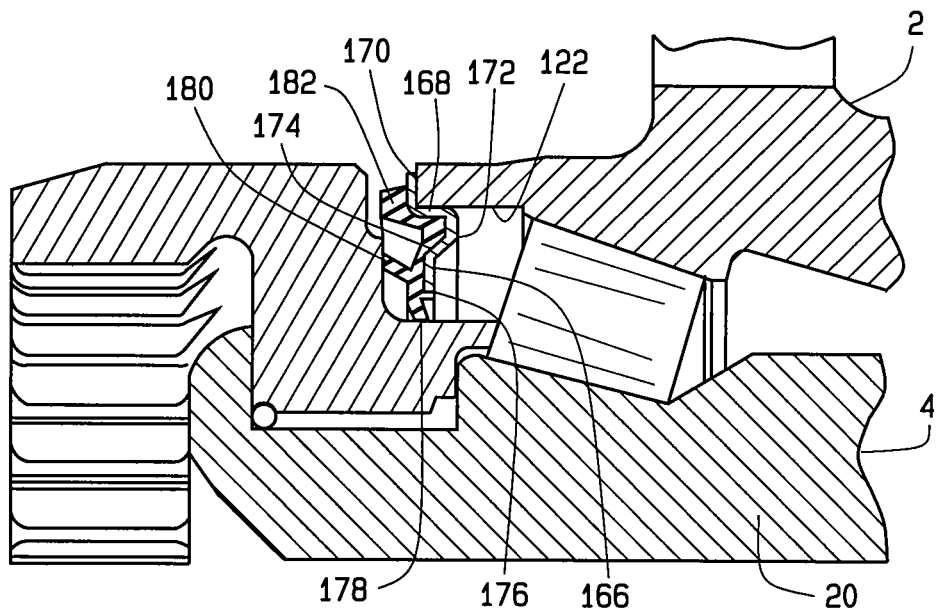
FIG. 15 is a fragmentary sectional view showing another inboard seal suitable for the wheel end.

The inboard seal 82 may assume an alternative configuration (FIG. 15). It has a case 166 provided with an axial wall 168 that is pressed into the counterbore 122 of the housing 2, an outwardly directed flange 170 at one end of the axial wall 168, and an inwardly directed radial wall 172 at the other end of the axial wall 168. The flange 170 abuts the end of the cylindrical body 10 and serves to position the seal 82 in the housing 2. The alternative seal 82 also has an elastomeric seal element 174 including a base 176 that is bonded to the axial and radial walls 168 and 172 of the seal case 166, a radial lip 178 that contacts the outer surface of the inner axial segment 66 of the coupler 8, and an axial lip 180 that contacts the radial segment 70 of the coupler 8. Actually, for this seal 82, the sealing surface 78 of the coupler 8 extends beneath both lips 178 and 180 of the seal element 174. In addition, the seal element 174 has an axially directed rib 182 which projects toward the radial segment 70 of the coupler 8 beyond the lips 178 and 180 to effect a labyrinth-type barrier with the coupler 8. Indeed, the coupler 8 may have a relief to receive the rib 182 and enhance the labyrinth barrier established by it.

The housing 2 may be formed from high carbon steel that is hardened along the outer raceways 40 and 42, and rib face 108, if present, such as by induction heating and quenching. In the alternative, it may be formed from low carbon steel that is case carburized and heat treated along the raceways 40 and 42, and rib face 108. Then again the raceways 40 and 42 and rib face 108 may be along hardened inserts set into the housing 2 which may be a casting. On the other hand, the outer raceways 40 and 42 may be on separate cups press fitted into the housing 2 or on a single double cup fitted to the housing 2.

Likewise, the hub 4 may be formed from high carbon steel that is hardened along the inner raceways 44 and 46 and also along the rib face 50. Then again it may be formed from low carbon steel that is case carburized and heat treated along those surfaces. The inner raceways 44 and 46 and the rib face 50 may be on inserts set into the hub spindle 20.

The coupler 8 is preferably formed from medium or high carbon steel, with the rib face 52 and the sealing surface 78 selectively hardened by an induction heating process. Alternatively, the coupler 8 could be manufactured using a powder metal process.

The wheel end A may be unified by means other than the formed end. For example, a nut may be treaded over the inboard end of the hub spindle 20 and against back of the coupler 8 to provide the abutment that retain retains the coupler 8 on the spindle 20.

The stub shaft 92 of the CV joint D need not be formed integral with the bell housing 90, but instead may take the form of a machine screw threaded into the bell housing 90 with its head against the hub 4 within the wheel pilot 22.

The brake rotor E instead of being installed against the outboard face of the drive flange 18 for the hub 4, may be installed against the inboard face.

The invention claimed is:

1. A wheel end for an automotive vehicle, said wheel end comprising:
    a housing having outboard and inboard ends;
    a hub having a drive flange located beyond the outboard end of the housing and a spindle that projects from the drive flange into the housing, the spindle at the inboard end of the housing having a shoulder and an abutment that is presented toward the shoulder and also an external spline located between the abutment and the shoulder;
    a bearing located between the housing and the hub spindle for enabling the hub to rotate relative to the housing about an axis, the bearing including:
        outboard and inboard outer raceways carried by housing and tapering downwardly toward each other so that they are closest at their least diameters;
        outboard and inboard inner raceways carried by the hub spindle between the drive flange and the shoulder and presented toward and tapering the same direction as the outboard and inboard outer raceways, respectively;
        an outboard rib face at the large end of one of the outboard raceways;
        an inboard rib face at the large end of the inboard inner raceway;
        outboard tapered rollers arranged in an outboard row between the outboard raceways with their large ends being along the outboard rib face, and
    inboard tapered rollers arranged in an inboard row between the inboard raceways with their large ends against the inboard rib face; and;
    a drive coupler captured between the shoulder and the abutment on the hub spindle and configured to connect with a CV joint, the coupler having an internal spline that engages the external spline on the hub spindle, the coupler projecting outwardly beyond the large end of the inboard inner raceway and providing the inboard rib face for the tapered rollers of the inboard row, the coupler further providing a sealing surface that extends generally radially and is presented toward the bearing, yet is axially offset from the inboard rib face.

2. A wheel end according to claim 1 wherein the abutment is a formed end that is an integral part of the spindle beyond the external spline, and the drive coupler is captured between the shoulder and the formed end of the hub spindle.

3. A wheel end according to claim 1 wherein the outer raceways are surfaces of the housing and the inner raceways are surfaces of the hub spindle.

4. A wheel end according to claim 1 wherein the drive coupler has a larger spline that is located radially outwardly from the internal spline that engages the external spline of the hub spindle.

5. A vehicle corner module comprising:
    the wheel end of claim 4; and a CV joint having a bell housing provided with spline that engages the larger spline of the drive coupler.

6. A vehicle corner module according to claim 5 wherein the CV joint also has a stub shaft that extends from the bell housing through the hub, with the hub being clamped between the bell housing and that end of the stub shaft that is remote from the bell housing.

7. A wheel end according to claim 4 wherein the larger spline of the drive coupler is located internally on the drive coupler and is offset axially with respect to the internal spline that engages the external spline on the hub spindle.

8. A vehicle corner module comprising:
the wheel end of claim 7; and
a CV joint having a bell housing that is against the coupler and an external spline that engages the larger internal spline of the coupler, the CV joint also having a stub shaft that extends from the bell housing through the hub, with the hub being clamped between the bell housing and that end of the stub shaft that is remote from the bell housing.

9. A wheel end according to claim 1 wherein the bearing also includes an inboard cage located between the inboard raceways and having pockets that contain the inboard rollers, with the pockets opening axially outwardly at the large ends of the rollers so that the rollers can fit axially into the pockets during assembly of the wheel end.

10. A wheel end according to claim 1 wherein the bearing includes an inboard cage located between the inboard raceways and having large and small end rings and bridges that extend between the end rings to define pockets that contain the rollers, with the small end ring extending past the small ends of the rollers, the large end ring extending past the large ends of the rollers, and the bridges extending between the rollers, the cage having had a region of weakness so that it fractured and expanded to a greater diameter to accommodate expansion of the inboard row of rollers during assembly of the bearing.

11. A wheel end according to claim 10 wherein the region of weakness extended longitudinally along one of the bridges.

12. A wheel end according to claim 1 wherein the seal has a seal case that is mounted on the housing and extends toward and effects a labyrinth-type barrier with the coupler; and wherein the seal also includes an elastomeric seal element that is bonded to the seal case and has the lip that contacts the sealing surface on the coupler.

13. A wheel end according to claim 12 wherein the coupler has an annular groove that receives an end of the seal case to enhance the labyrinth-type barrier.

14. A wheel end according to claim 1 wherein the seal includes a seal case that is mounted on the housing and an elastomeric seal element that has the lip and also has a rib that effects labyrinth-type barrier with the coupler.

15. A wheel end according to claim 1 wherein the seal has a seal case that is fitted to the housing and an elastomeric seal element that is bonded to the seal case and has the lip that contacts and is deflected by the sealing surface on the coupler; and wherein a prescribed axial distance exists between the large end faces of the inboard rollers and the seal case, with that distance being such that the lip of the seal will deflect the proper amount against the sealing surface.

16. A wheel end according to claim 1 and further comprising a deformable spacer interposed between the shoulder on the spindle and the coupler to establish the axial position of the inboard rib face.

17. A wheel end according to claim 16 wherein the spacer is deformed sufficiently to place the bearing in preload, there being a prescribed torque required to maintain rotation between the hub and housing.

18. A wheel end according to claim 1 wherein the housing carries a seal having at least one lip that contacts the sealing surface on the coupler ring.

19. A wheel end according to claim 18 wherein the seal has a seal case that is mounted on the housing; and
wherein the seal also includes an elastomeric seal element that is bonded to the seal case and has the lip that contacts the sealing surface on the coupler.

20. A wheel end comprising:
a housing having outboard and inboard ends;
a hub having a drive flange located beyond the outboard end of the housing and a spindle that extends into the housing;
a bearing located between the housing and the hub spindle to enable the hub to rotate relative to the housing about an axis, the bearing including tapered rollers organized in outboard and inboard rows, with the rollers of the two rows being closest at their small ends, the bearing also including rib faces against which the large ends of the rollers bear;
a coupler captured on and connected to the hub spindle for rotation with the hub and being configured to connect with a CV joint radially outwardly from the hub spindle, the rib face against which the large ends of the rollers for the inboard row bear being on the coupler, the coupler having a sealing surface that is directed generally radially with respect to the axis and is presented toward the tapered rollers in the inboard row; and
an elastomeric seal element carried by the housing and contacting the sealing surface.

21. A wheel end according to claim 20 wherein the coupler is connected to the hub spindle through mating splines.

22. A corner module comprising:
the wheel end of claim 21; and
a CV joint having a bell housing that is connected to the coupler through mating splines having diameters greater than the diameters of the mating splines that connect the coupler to the hub spindle.

23. A wheel end according to claim 20 wherein the sealing surface is offset axially from the rib face against which the large ends of the roller of the inboard row bear.

* * * * *